US009319778B2

(12) United States Patent
Chandra et al.

(10) Patent No.: US 9,319,778 B2
(45) Date of Patent: Apr. 19, 2016

(54) COMMUNICATING VIA A BODY-AREA NETWORK

(71) Applicant: GOOGLE TECHNOLOGY HOLDINGS LLC, Mountain View, CA (US)

(72) Inventors: Deepak Chandra, Mountain View, CA (US); Per Bo Johan Ljung, Oakland, CA (US)

(73) Assignee: GOOGLE INC., Mountain View, CA (US)

(*) Notice: Subject to any disclaimer, the term of this patent is extended or adjusted under 35 U.S.C. 154(b) by 326 days.

(21) Appl. No.: 13/890,319

(22) Filed: May 9, 2013

(65) Prior Publication Data

US 2014/0270233 A1 Sep. 18, 2014

Related U.S. Application Data

(60) Provisional application No. 61/778,975, filed on Mar. 13, 2013, provisional application No. 61/778,944, filed on Mar. 13, 2013, provisional application No. 61/778,913, filed on Mar. 13, 2013.

(51) Int. Cl.
*H04R 1/10* (2006.01)
*H04R 3/00* (2006.01)
(Continued)

(52) U.S. Cl.
CPC *H04R 3/00* (2013.01); *G06F 21/32* (2013.01); *H04B 13/005* (2013.01); *H04L 63/10* (2013.01); *H04M 1/6066* (2013.01); *H04R 1/1091* (2013.01); *H04W 88/02* (2013.01)

(58) Field of Classification Search
CPC ........... H04R 2460/00; H04R 2460/01; H04R 2460/03; H04R 2460/05; H04R 2460/07; H04R 2460/09; H04R 2460/11; H04R 2460/13; H04R 2460/15; H04R 2460/17; H04R 1/1091; H04R 1/1033; H04R 1/06; H04R 1/10; H04R 1/1008; H04R 1/1016; H04R 2420/07; H04R 2201/107; H04R 3/00; H04R 5/033; H04R 2420/09; H04R 2430/01; H04R 2201/109; H04R 5/04; H03G 3/00; H03G 3/02; H03G 3/20; H03G 5/165

USPC ......... 381/72, 74, 151, 312; 370/238; 700/94; 455/569.1, 575.2
See application file for complete search history.

(56) References Cited

U.S. PATENT DOCUMENTS 5,790,684 A * 8/1998 Niino .................. H04M 1/6058
                                                    381/151
7,978,064 B2    7/2011 Zdeblick et al.
(Continued)

FOREIGN PATENT DOCUMENTS

EP    1033687 A2    9/2000
EP    1096722 A2    5/2001
(Continued)

OTHER PUBLICATIONS

Zimmerman TG: "Personal Area Networks: Near-Field Intrabody Communication", IBM Systems Journal, IBM Corp. Armonk, New York, US vol. 35, No. 3/04, Jan. 1, 1996, pp. 609-617.
(Continued)

*Primary Examiner* — Leshui Zhang
(74) *Attorney, Agent, or Firm* — Johnson, Marcou & Isaacs, LLC (57) ABSTRACT

In a first example of "Body-Area Networking" ("BAN"), a user wishing to access his electronic device ingests a small pill carrying a transmitter. The transmitter's signal carries an identification code that traverses the user's BAN and is read by the device. If the device recognizes that identification code as authenticate, then the device grants the user the desired access. In another example, the user again swallows a transmitter. When the user shakes hands with another person, the signal originating at the ingested transmitter is carried across the BAN of the first user, travels across the handshake to the BAN of the second user, then traverses the second user's BAN to her device. In a third example, a media player transmits audio information across the BAN to a headset worn by the user. The headset receives the signal, demodulates it, and renders the audio to the user.

17 Claims, 9 Drawing Sheets

(51) Int. Cl.
*G06F 21/32* (2013.01)
*H04B 13/00* (2006.01)
*H04M 1/60* (2006.01)
*H04L 29/06* (2006.01)
*H04W 88/02* (2009.01)

(56) References Cited

U.S. PATENT DOCUMENTS

| | | | |
|---|---|---|---|
| 8,114,021 | B2 | 2/2012 | Robertson et al. |
| 2004/0202339 | A1* | 10/2004 | O'Brien, Jr. .......... H04B 13/005 381/312 |
| 2007/0041595 | A1* | 2/2007 | Carazo .................. H04R 17/00 381/151 |
| 2008/0294722 | A1 | 11/2008 | Park et al. |
| 2008/0303638 | A1 | 12/2008 | Nguyen et al. |
| 2008/0306360 | A1 | 12/2008 | Robertson et al. |
| 2009/0233548 | A1 | 9/2009 | Andersson et al. |
| 2010/0121315 | A1 | 5/2010 | Trovato et al. |
| 2010/0238955 | A1 | 9/2010 | Sung et al. |
| 2013/0142363 | A1* | 6/2013 | Amento .................. H04K 1/00 381/151 |
| 2014/0273829 | A1 | 9/2014 | Chandra et al. |
| 2014/0283017 | A1 | 9/2014 | Chandra et al. |

FOREIGN PATENT DOCUMENTS

| | | |
|---|---|---|
| JP | 2007006420 A | 1/2007 |
| WO | 9623373 A1 | 8/1996 |
| WO | 2008/120128 A2 | 10/2008 |
| WO | 2014/143458 | 9/2014 |
| WO | 2014/163746 | 9/2014 |
| WO | 2014/163748 | 9/2014 |

OTHER PUBLICATIONS

Patent Cooperation Treaty, International Search Report and Written Opinion of the International Searching Authority for International Application No. PCT/US2014/015012, Apr. 15, 2014, 13 pages.
Proteus Digital Health, http://proteusdigitalhealth.com/technology/, 2012, 1 page.
Bertolissi, E., International Search Report of the International Searching Authority for International Application No. PCT/US2014/014989, May 21, 2014, pp. 1-4.
De Vries, J., International Search Report of the International Searching Authority for International Application No. PCT/US2014/014989, May 28, 2014, pp. 1-4.
Matsushita N., "Wearable Key: Device for Personalizing Nearby Environment", Wearable Computers, The Fourth International Symposium on Atlanta, GA, US, Oct. 16-17, 2000, pp. 119-126.

* cited by examiner

COMMUNICATING VIA A BODY-AREA NETWORK

CROSS-REFERENCE TO RELATED APPLICATIONS

This patent application claims priority to U.S. Provisional Patent Application Nos. 61/778,975, 61/778,944, and 61/778,913 filed Mar. 13, 2013 and entitled "Communicating Via a Body-Area Network." This patent application is related to U.S. Non-Provisional patent application Ser. Nos. 13/890,299 and 13/890,305, filed on an even date herewith.

TECHNICAL FIELD

The present disclosure is related generally to electronic communications and, more particularly, to body-area networking.

BACKGROUND

Recent engineering studies show that electrical signals can be transmitted through a human body. With careful configuration, these signals can be modulated to carry digital information across a so-called "Body-Area Network" ("BAN").

One company, for example, makes small ingestible pills. Each pill contains the circuitry for a transmitter. When the outer covering of the pill dissolves in a digestive tract, contacts are exposed to stomach acid. The stomach acid acts as a dielectric to power the transmitter. (For safety's sake, the pill contains no other power source.) When powered up, the transmitter repeatedly sends out a weak electrical signal. The signal is carried across the BAN to a receiving device located outside, but in physical contact with, the ingestor's body. The receiver demodulates the signal into an identification code. The transmitter continues to send out its signal until the process of digestion dissolves the pill. The transmitter typically transmits for a total of five to seven minutes.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The emerging technology of BAN communications can be profitably used in a variety of situations. Consider first the communications environment of FIG. 1a. Here, a user 100 wishes to access his electronic device 102. For security's sake, the device 102 will not allow the user 100 to access it until he provides some identification information. Traditionally, the user 100 could enter a user name and a password, or the device 102 could recognize a signature or fingerprint submitted by the user 100. Aspects of the present invention, however, eliminate the need for these techniques. The user 100 ingests a small pill carrying a transmitter 104. The transmitter's signal carries an identification code that traverses the user's BAN and is read by the device 102. If the device 102 recognizes that identification code as authenticate (using techniques described below), then the device 102 grants the user 100 the desired access.

Figure 1A:
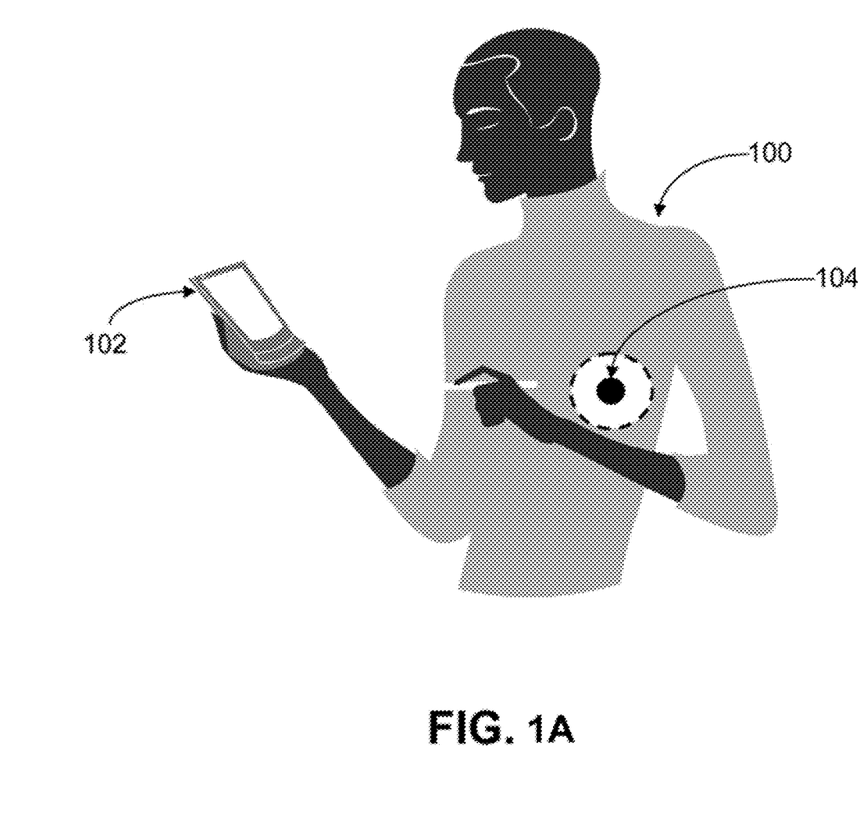
FIGS. 1a, 1b, and 1c are overviews of representative environments in which the present techniques may be practiced.
Figure 1B:
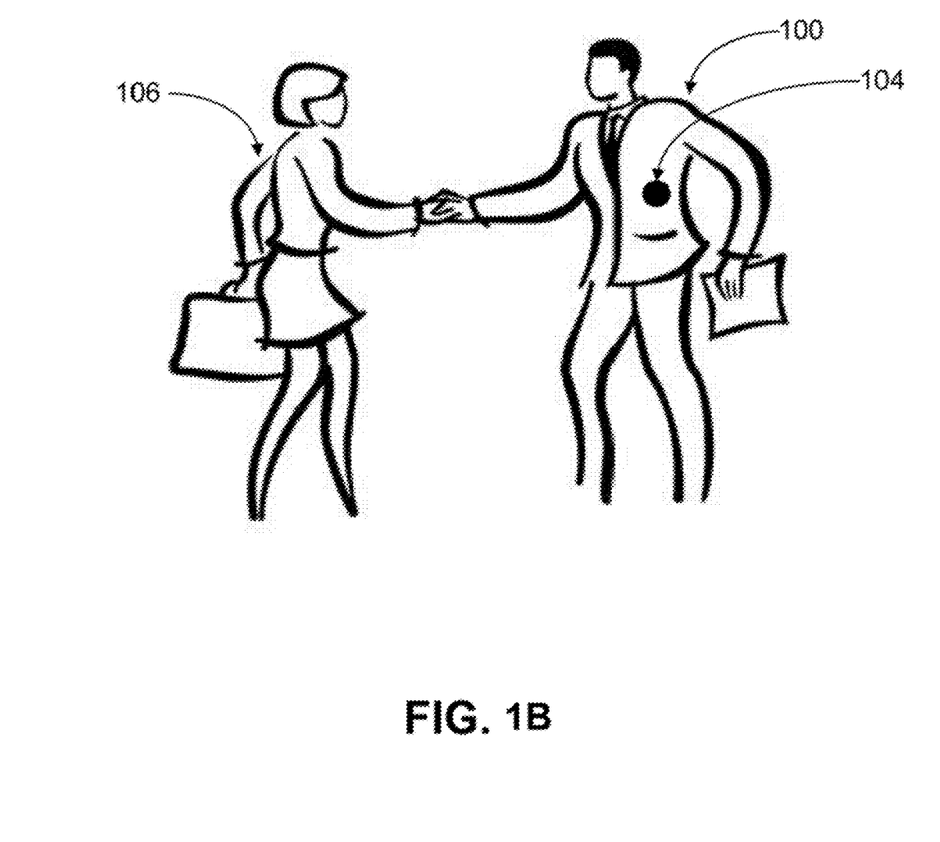
Figure 4A:
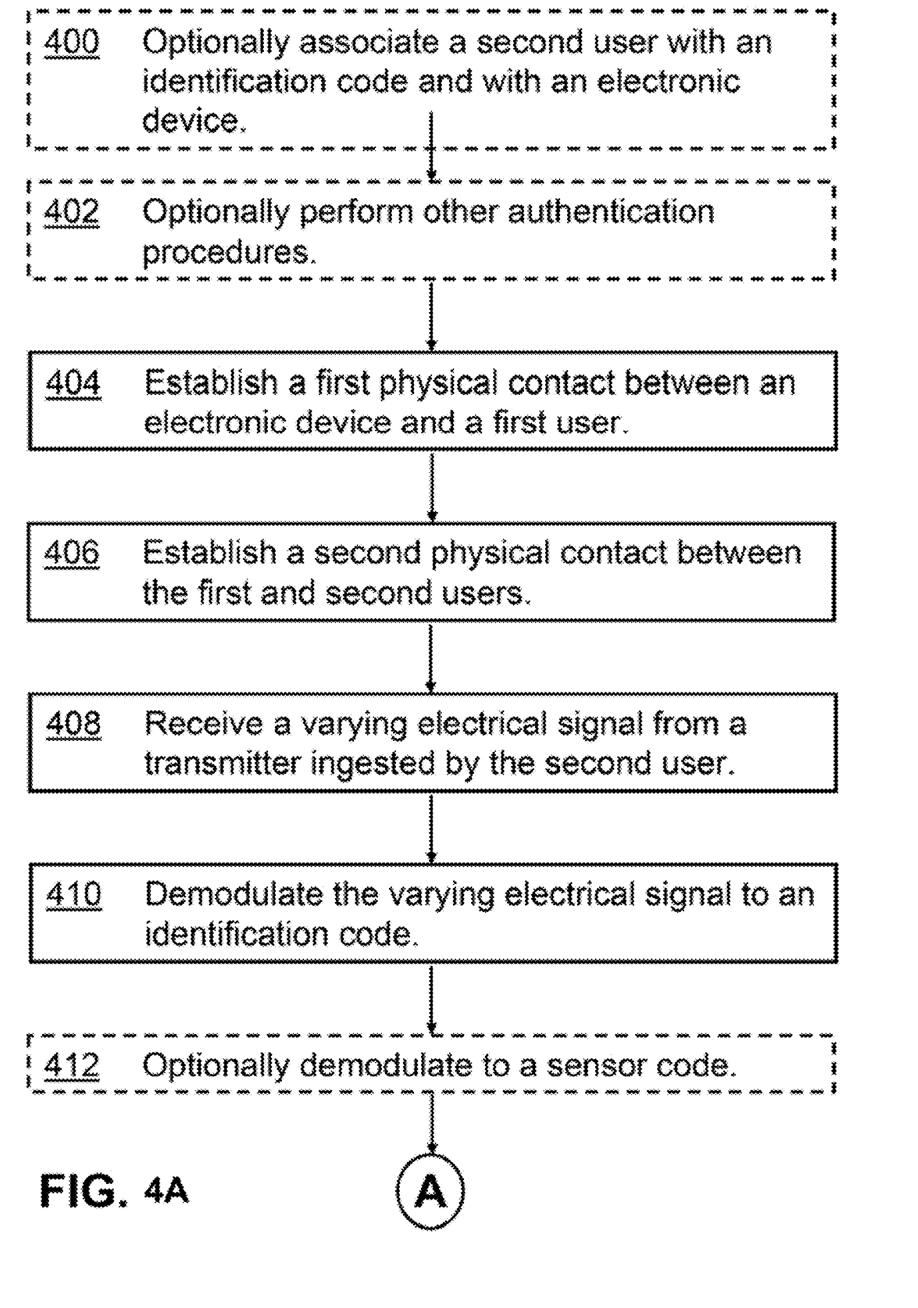
FIGS. 4A and 4B together form a flowchart of a representative method for delivering information about one person to another person.
Figure 4B:
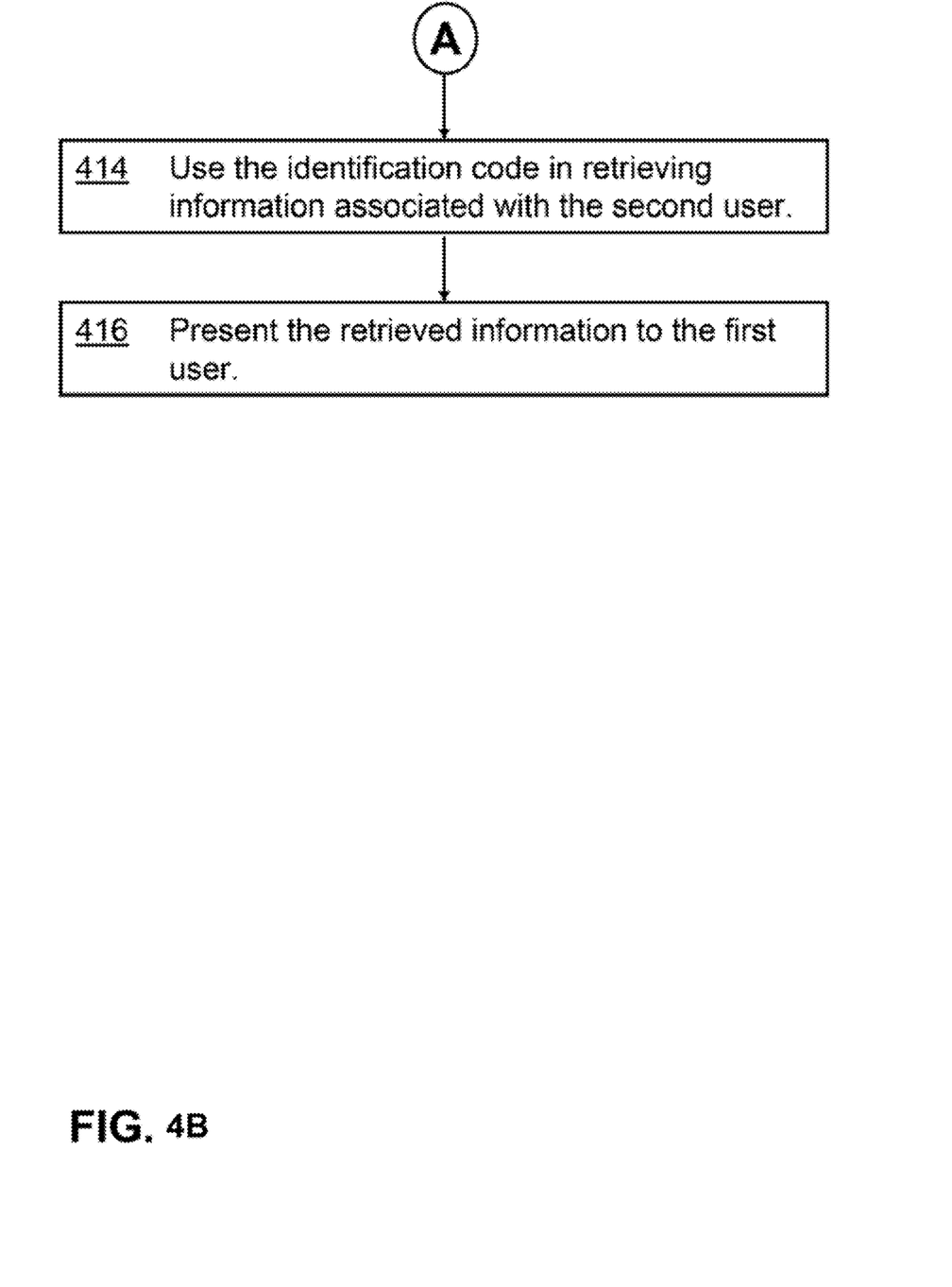

Another use of BAN communications is illustrated in FIG. 1b. Again, the user 100 has swallowed a transmitter 104 that constantly transmits an identification code. When the user 100 shakes hands with another person 106, it is a device 102 (not shown) on this other user 106 that receives the signal. That is to say, the signal originating at the ingested transmitter 104 is carried across the BAN of first user 100, travels across the handshake to the BAN of the second user 106, then traverses the second user's BAN to her device 102. In one application of this two-BAN scenario, the second user's device 102 runs a virtual "Farley File" application: When it receives the identification code sent by the transmitter 104, it recognizes the code and associates it with a particular person, here the first user 100. That recognition can make use of a contacts file on the device 102 or an online database, for example. The Farley File application then presents this information to the second user 106 to refresh her memory of whom it is she is currently meeting. Other applications of this two-BAN scenario are discussed below in relation to FIG. 4.

Figure 1C:
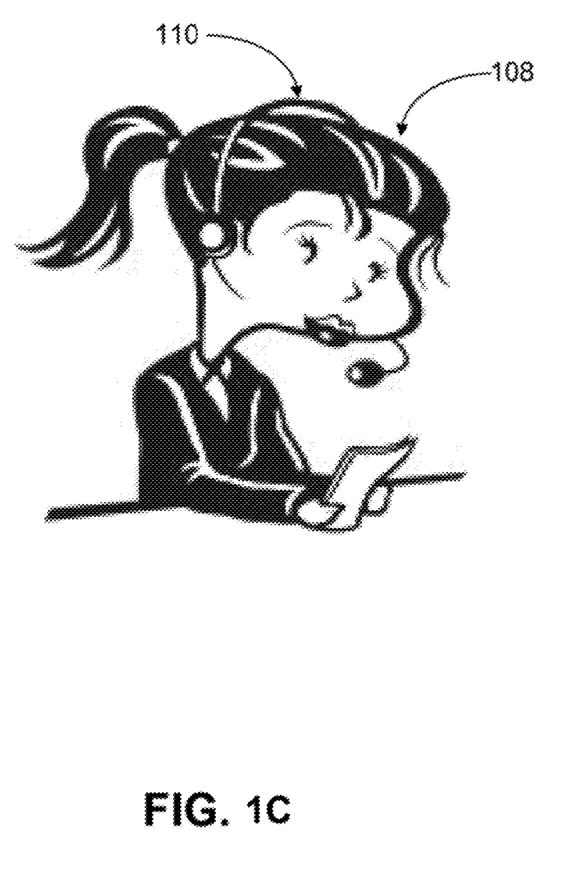

In the examples of FIGS. 1a and 1b, the electronic device 102 receives a signal coming through the BAN. The example of FIG. 1c shows that the device 102 can also transmit across the BAN. The user 108 is wearing a headset 110. Rather than wiring the headset to a media-player device 102 (not shown) or connecting via a short-range radio protocol such as Bluetooth, the media player 102 transmits audio information across the BAN to the headset 110. The headset 110 receives the signal, demodulates it, and renders the audio to the user 108. The particular headset 110 of FIG. 1c also includes a microphone, and the headset 110 can transmit voice captured by the microphone across the BAN to the media-player device 102. If, of course, the media player 102 also includes a wide-area communications capability (e.g., it is a cellular telephone), then it can transfer sounds and other information between the headset 110 and remote locations to support, for example, a telephone call, a media download, or web-site access.

Figure 2:
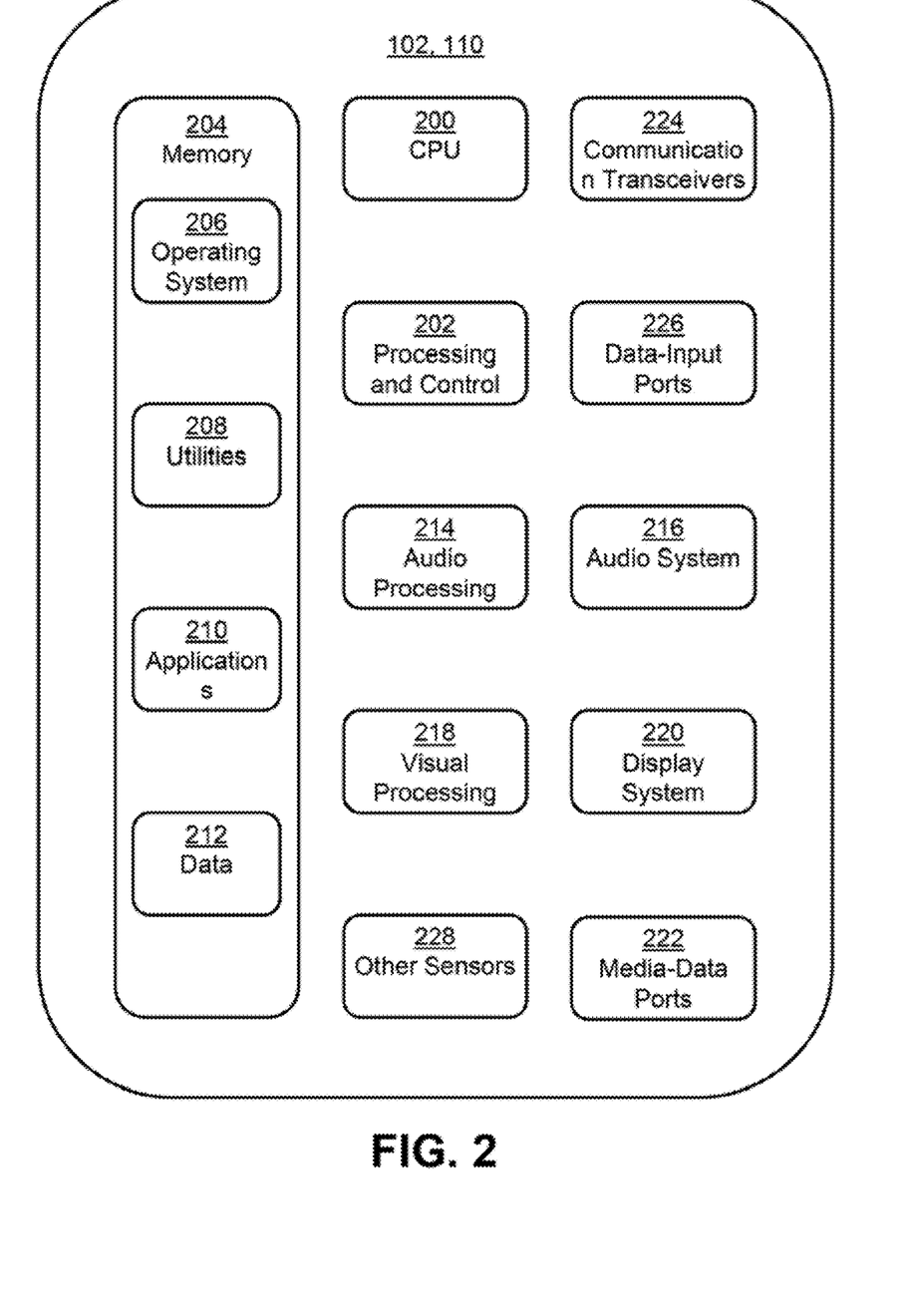
FIG. 2 is a generalized schematic of some of the devices of FIG. 1.

FIG. 2 shows the major components of a representative electronics device 102, 110. These devices 102, 110 could be, for example, a smartphone, tablet, personal computer, electronic book, or gaming controller. In some situations, the device 102, 110 could be in the form of a watch, a pair of eyeglasses, a headset, a set-top box, an automated teller machine, a cash register, an order-entry device, a lock, a handle, or a media player.

Figure 3A:
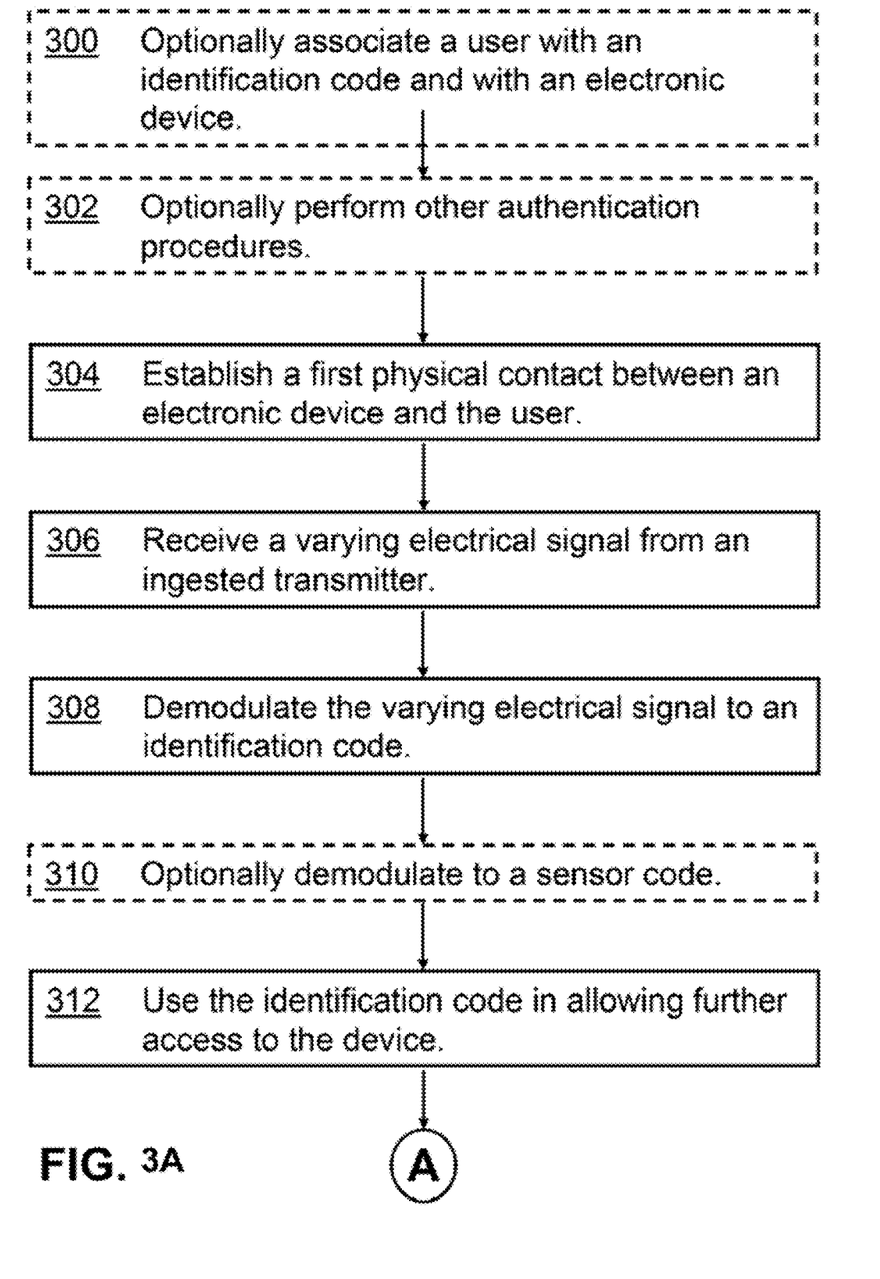
FIGS. 3A and 3B together form a flowchart of a representative method for allowing access to a device based on a signal received from an ingested transmitter.
Figure 3B:
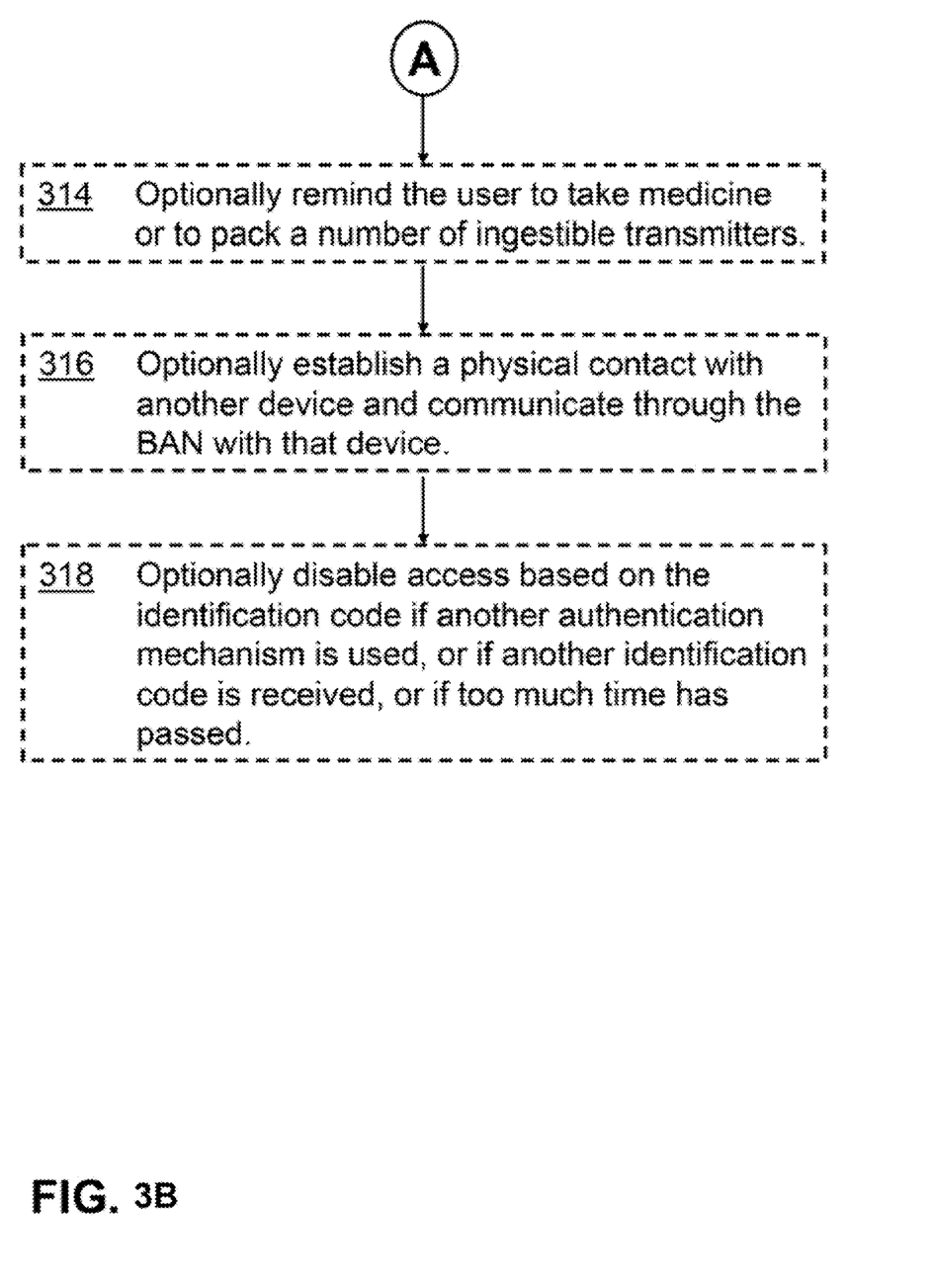
Figure 5:
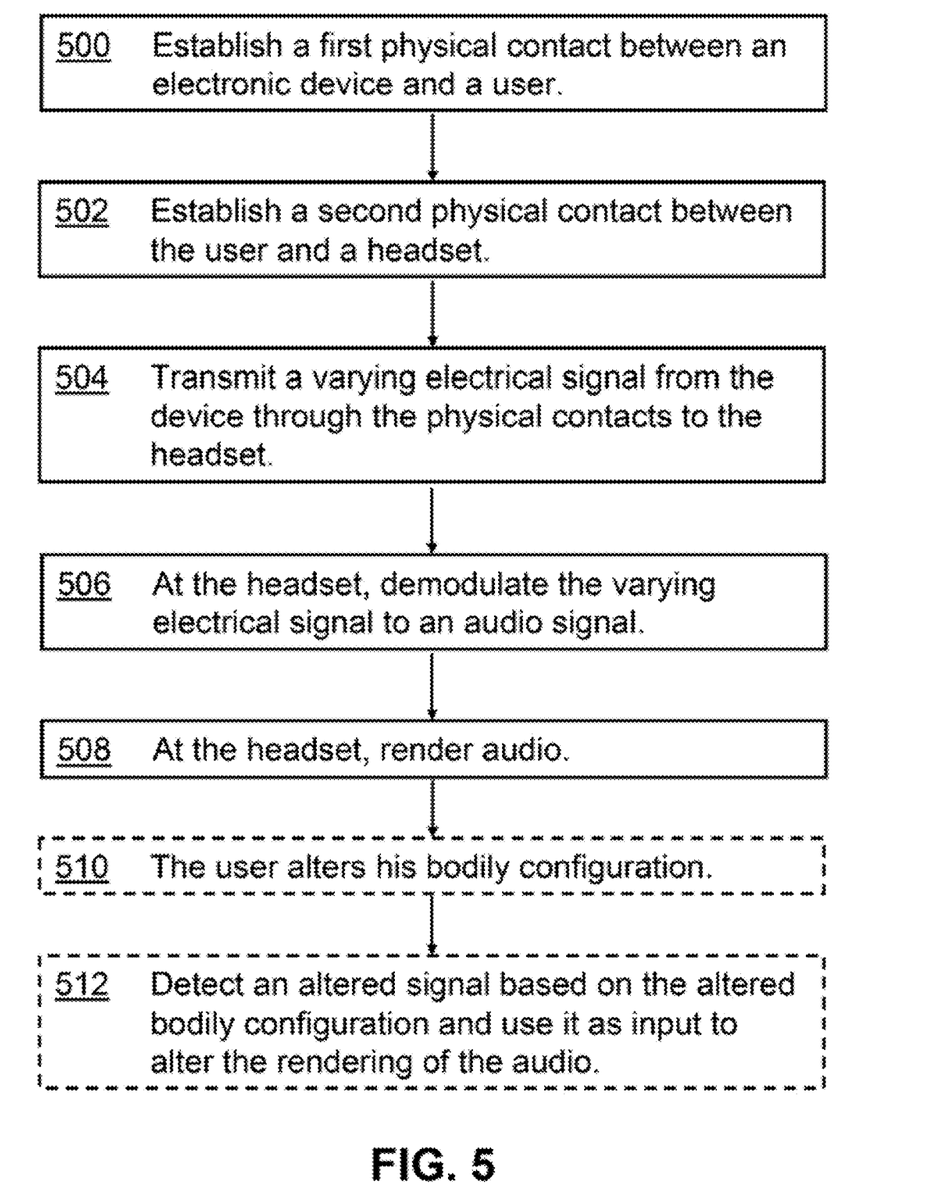
FIG. 5 is a flowchart of a representative method for transmitting audio information via a BAN.

The CPU 200 of the electronics device 102, 110 includes one or more processors (i.e., any of microprocessors, controllers, and the like) or a processor and memory system which processes computer-executable instructions to control the operation of the device 102, 110. In particular, the CPU 200 supports aspects of the present disclosure as illustrated in FIGS. 3 through 5, discussed below. The device 102, 110 can be implemented with a combination of software, hardware, firmware, and fixed-logic circuitry implemented in connection with processing and control circuits, generally identified at 202. Although not shown, the device 102, 110 can include a system bus or data-transfer system that couples the various components within the device 102, 110. A system bus can include any combination of different bus structures, such as a memory bus or memory controller, a peripheral bus, a universal serial bus, and a processor or local bus that utilizes any of a variety of bus architectures.

The electronics device 102, 110 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device 102, 110 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronics device 102, 110, a hardware-abstraction layer for a particular component, and so on.

The electronics device 102, 110 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 102, 110. Alternatively (e.g., in a cellular telephone), these systems 216, 220 are integrated components of the device 102, 110.

The electronics device 102, 110 can include a communications interface which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios, Wireless Metropolitan Area Network radios compliant with various IEEE 802.16 standards, and wired Local Area Network Ethernet transceivers.

The electronics device 102, 110 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 102, 110 to components, peripherals, or accessories such as microphones and cameras.

Finally, the electronics device 102, 110 may include any number of "other sensors" 228. These sensors 228 can include, for example, accelerometers, a GPS receiver, compass, magnetic-field sensor, and the like.

FIGS. 3a and 3b together present a representative method for using BAN communications in the environment of FIG. 1a.

Steps 300 and 302 prepare the ground for the later authentication step 312. Each ingestible transmitter 104 can be given a different identification code. In a very simple example of step 300, a "white list" of the identification codes of the transmitters 104 that will be used by this user 100 are entered into his device 102. This process is ideally a secure one because the security of later authentication is based on it. If the ingestible transmitters 104 are prescription items, then their identification codes can be encoded onto their packaging and those codes read by the device 102. Alternatively, the codes could be downloaded from the pharmacy's server to the device 102 when the user 100 picks up the prescribed transmitters 104. More secure, the packaging (or pharmacy download) could include a unique identifier that the device 102 uses when accessing a secure web server to download the identification codes.

As another known security technique, the identification codes associated with the transmitters 104 can be placed in a set sequence. If a nefarious agent manages to get hold of a transmitter 104 but uses it out-of-sequence, then he would be denied access in step 312, described below.

A one-time-pad security mechanism can also be used along with the identification codes of the individual transmitters 104. Though highly secure, one-time pads are often an administrative nuisance and are thus mostly useful where access to the device 102 needs to be highly controlled (e.g., rather than being a personal cellular telephone, the device 102 is an electronic lock mediating entrance into a secured facility).

Also in step 300, the user 100 can be identified to the device 102, for example by storing a profile of the user 100 on the device 102.

Where more than one user 100 should be allowed access to the device 102 (e.g., all members of one family may use the same device 102), then the identification codes can be associated with all of the relevant users 100, and all of the relevant users 100 can be associated with the device 102.

Other known security techniques can be implemented as appropriate, given the level of security desired.

With the security preliminaries established, if necessary, the user 100 begins the actual identification method of FIG. 3 by establishing a physical contact with the device 102 in step 304. Tests have shown that when the device 102 is a smartphone, a two-finger contact, using one finger from each hand, tends to be more reliable than using two fingers on the same hand. The device 102 may expose two dedicated contact points. Alternatively, one contact point may be the capacitive touch-screen of the device 102, while the other contact point is a frame of the device 102. For devices 102 with form factors other than the typical smartphone, other contact placements may be appropriate.

In step 306, a varying electrical signal originating at the ingested transmitter 104 traverses the BAN of the user 100 until it is detected, via the physical contact established in step 304, by the device 102. Different transmitters 104 may be developed that use different signaling mechanisms. Thus, the detected current could be, for example, a direct electrical current, an alternating current, or a varying capacitive field.

In any case, the device 102 demodulates the received signal to an identification code in step 308. The received signal can also include information beyond this identification code. This possibility is discussed below in relation to optional step 310.

In step 312, the identification code is checked and, if appropriate, the user 100 is allowed further access to the device 102. The checking here can call in all of the authentication mechanisms discussed above in relation to steps 300 and 302. If, for example, a specific sequence of codes has been defined, then one particular identification code be legitimate, but if it is encountered out-of-sequence, then it would be rejected.

The allowed "further access" can have any number of meanings. Even if security is not an issue, the device 102 can configure itself according to the stated profile and preferences of this particular user 100, that is, it can give the user 100 his preferred login environment. Just as with traditional password-protected systems, different users 100 can be allowed different levels of access, with some users being allowed to alter parameters of the device 102. Also, the access can vary dramatically with the form factor of the device 102. If the device 102 is an electronic lock, then it could allow the user 100 to open a door. If the device 102 is an automated teller machine, it may automatically bring up a screen displaying the user's current checking balance. In general, the techniques of FIG. 3 can be implemented with just about any device 102 that recognizes its users 100.

Returning to optional step 310, the transmitter 104 can send information beyond its identification code. If the ingestible pill that carries the transmitter 104 also carries a sensor (e.g., a temperature or stomach-acid sensor), then readings from that sensor could be sent to the device 102. If, for example, a device 102 carried by a fireman detects, from body-temperature information transmitted by an ingestible sensor, that the fireman's core temperature is dangerously elevated, then the device 102 could warn the fireman to withdraw or could call for assistance.

In optional step 314 of FIG. 3b, the device 102 can note the timing and frequency with which the user 100 ingests the transmitters 104. For transmitters 104 associated with prescribed medication, if the device 102 has access to the desired medication schedule, then it can remind the user 100 if he seems to have missed taking his medicine on time. By looking at the user's calendar, the device 102 might note that the user will be traveling soon and will remind the user 100 to pack enough transmitters 104 for the duration of the trip.

As an extension of the method already described, the device 102 can transmit back over the BAN of the user 100 to another device (step 316). An example of this option is more fully described in the text accompanying FIGS. 1c and 5.

Step 318 gives a few scenarios where the device 102 may optionally cease to trust the identification code read in step 308. As an added security option, if the user 100 uses a non-pill based authentication mechanism (e.g., a fingerprint scanner), then the device 102 will ignore the identification code. If another identification code is received (e.g., if the user 100 ingests another transmitter 104), then the first identification code would no longer be trusted. This scenario could also occur when a sophisticated transmitter 104 changes the code that it is transmitting: Again, the earlier code is no longer to be trusted. As a final option, a time window can be set wherein the identification code is accepted. If the code is still being received after the window closes, then something strange may be going on, and the code is no longer trusted. (Current transmitters 104 only work for five to seven minutes before stomach acid dissolves them into inoperability. Thus, any code received for longer than seven minutes may be fraudulent. While future transmitters 104 may last longer, it is anticipated that they may also have a relatively fixed time window of acceptability.)

The representative method of FIGS. 4a and 4b can be used in the BAN-communications scenario of FIG. 1b. Some of the steps of this method are similar to those of the method of FIGS. 3a and 3b. As in that previous method, preliminary authentication mechanisms may be implemented (steps 400 and 402 of FIG. 4a.)

In step 404, the user 106 of FIG. 1b establishes a physical contact with her electronic device 102. (See step 304 of FIG. 3a.)

The user 106 establishes a physical contact (e.g., she shakes hands) with another user 100 in step 406. It is this user 100 who has ingested a transmitter 104. The signal emitted by that transmitter 104 traverses the BAN of the user 100, crosses over via the handshake, traverses the BAN of the user 106, and is read by her device 102 in step 408.

The reading of the signal (step 408) and the demodulating of the signal (step 410 and optional step 412) can be as performed above in steps 306 through 310 of FIG. 3a.

Then in step 414 of FIG. 4b, the device 102 uses the identification code to retrieve some information about the user 100. For example, the identification code is associated (in step 400 of FIG. 4a) with a person in the device's contact list. The device 102 retrieves that contact information (or possibly updates the contact information by pulling information from the web) and passes it along to the user 106 in step 416. If the user 106 is wearing an earbud, for example, the device 106 can "whisper" the name of the person 100 in her ear. Other information, if available, can be provided such as the last time she met this person 100, the name of the organization he represents, and the like. Thus, the user 106 may be spared the embarrassment of having to admit that she does not recognize the user 100.

The BAN-communications scenario of FIG. 1c differs from the previous two because it does not involve an ingestible transmitter 104. However, many of the techniques discussed above apply here as well.

In steps 500 and 502, the user 108 establishes a first physical contact between herself and her electronic device 102 and establishes a second physical contact between herself and a headset 110 (which could involve simply placing earbuds in her ears).

Her device 102 acts as a media-playback device by sending, in step 504, audio information (which could be stereo) across the first physical contact, through the BAN of the user 108, and across the second physical contact to the headset 110.

The headset 110 receives the signal in step 506, demodulates it into an audio signal, and plays the audio to the user 108 (step 508). Optionally, a signal can be sent in the other direction from a microphone on the headset 110 to the device 102.

Of special interest are optional steps 510 and 512. When the user 108 alters her bodily configuration (step 510), she changes the transmission characteristics of her BAN. If the change is great enough, it can be detected either by the media player 102 or by the headset 110. The detected change can be interpreted as a playback command (step 512). Thus, for example, if the user 108 draws her right hand down her left forearm, that might mean that she wishes to turn down the volume. Other gestures could be devised that would be interpreted as other well known playback commands, such as pause, fast-forward, change stations, and the like.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method to transmit audio information from an electronic device to a headset device, comprising:
    establishing a first physical contact between an electronic device and a body of a user;
    establishing, concurrently with the first physical contact, a second physical contact between a headset device and the body of the user;
    transmitting, by the electronic device through the body of the user via the first and second physical contacts to the headset device, a first varying electrical signal, wherein the body of the user is in a first spatial configuration at the time the first varying electrical signal is transmitted;
    demodulating, by the headset device, the transmitted first varying electrical signal to an audio signal;
    based at least in part on the demodulated audio signal, rendering, by the headset device, an output of audio;
    detecting, by the headset device or the electronic device, a second electrical signal comprising an alteration of the first varying electrical signal, the alteration caused by a modification of the first spatial configuration of the body of the user to a second spatial configuration of the body of the user while maintaining the first and second physical contacts; and
    based at least in part on the detected alteration of the first varying electrical signal, altering the rendering of the audio output.

2. The method of claim 1, wherein the first varying electrical signal comprises a direct electrical current, an alternating electrical current, or a varying capacitive field.

3. The method of claim 1, wherein the audio signal comprises a plurality of audio channels.

4. The method of claim 1, wherein altering the rendering of the audio output comprises altering a playback volume, pausing, stopping, rewinding, fast-forwarding, swapping audio channels from left to right, selecting a next track of an audio program, or switching to another audio program.

5. The method of claim 1, wherein the modification of the first spatial configuration of the body of the user to a second spatial configuration of the body of the user comprises performing, by the user, a bodily gesture.

6. The method of claim 5, wherein performing the bodily gesture comprises moving, by the user, a hand associated with the body of the user across an arm associated with the body of the user.

7. A method to transmit audio information from an electronic device to a headset device, comprising:
    establishing a first physical contact between an electronic device and a body of a user, the body of the user being in a first spatial configuration;
    transmitting, by the electronic device to a headset device via the first physical contact and via a second physical contact between the headset device and the body of the user, a first varying electrical signal;
    detecting, by the headset device, a second electrical signal comprising an alteration of the first varying electrical signal, the alteration caused by a modification of the first spatial configuration of the body of the user to a second spatial configuration of the body of the user while maintaining the first and second physical contacts; and
    based, at least in part, on the detected alteration of the first varying electrical signal, altering the first varying electrical signal transmitted by the electronic device to the headset device.

8. The method of claim 7, wherein the first varying electrical signal comprises a direct electrical current, an alternating electrical current, or a varying capacitive field.

9. The method of claim 7, wherein altering the first varying electrical signal results in altering a playback volume, pausing, stopping, rewinding, fast-forwarding, swapping audio channels from left to right, selecting a next track of an audio program, or switching to another audio program in an audio output associated with the first varying signal.

10. An electronic device configured to transmit audio information to a headset device, the electronic device comprising:
    a communications interface comprising two electrodes and configured to establish a first physical contact with a body of a user, and
    a processor operatively connected to the communications interface and configured to:
        transmit, to the headset device via the first physical contact and via a second physical contact between the headset device and the body of the user, a first varying electrical signal, wherein the body of the user is in a first spatial configuration,
        detecting a second electrical signal comprising an alteration of the first varying electrical signal, the alteration caused by a modification of the first spatial configuration of the body of the user to a second spatial configuration of the body of the user while maintaining the first and second physical contacts; and
        based, at least in part, on the detected alteration of the first varying electrical signal, altering the first varying electrical signal transmitted to the headset device.

11. The electronic device of claim 10, wherein the electronic device comprises a personal electronics device, a mobile telephone, a personal digital assistant, a watch, eyeglasses, a computer, a tablet computer, or a media player.

12. A method to receive transmitted audio information, comprising:
    establishing a first physical contact between a headset device and a body of a user;
    receiving, by the headset device, and from an electronic device via the first physical contact and a second physical contact between the electronic device and the body of the user, a first varying electrical signal, wherein the body of the user is in a first spatial configuration at the time the first varying electrical signal is received;
    demodulating, by the headset device, the received first varying electrical signal to an audio signal to produce a demodulated audio signal;
    based, at least in part on the demodulated audio signal, rendering, by the headset device, an audio output;
    modifying, by the user, the first spatial configuration of the body of the user to a second spatial configuration of the body of the user;
    detecting, by the headset device, a second electrical signal from the electronic device comprising an alteration of the first varying electrical signal, the alteration caused by a modification of the first spatial configuration of the body of the user to a second spatial configuration of the body of the user while maintaining the first and second physical contacts; and based, at least in part, on the alteration of the first varying electrical signal, altering the rendering of the audio output.

13. The method of claim 12, wherein the first varying electrical signal comprises a direct electrical current, an alternating electrical current, or a varying capacitive field.

14. The method of claim 12, wherein the audio signal comprises a plurality of audio channels.

15. The method of claim 12, wherein altering the rendering of the audio output comprises altering a playback volume, pausing, stopping, rewinding, fast-forwarding, swapping audio channels from left to right, selecting a next track of an audio program, or switching to another audio program.

16. A headset device configured to receive transmitted audio information, the headset device comprising:

a communications interface comprising two electrodes and configured to establish a first physical contact with a body of a user; and a processor operatively connected to the communications interface and configured for:

receiving, from an electronic device via the first physical contact and a second physical contact between the electronic device and the body of the user, a first varying electrical signal, wherein the body of the user is in a first spatial configuration at the time the first varying electrical signal is received;

demodulating the first varying electrical signal to an audio signal;

based, at least in part on the audio signal, rendering an audio output, detecting a second electrical signal from the electronic device comprising an alteration of the first varying electrical signal, the alteration caused by a modification of the first spatial configuration of the body of the user to a second spatial configuration of the body of the user while maintaining the first and second physical contacts; and based, at least in part, on the detected alteration of the first varying electrical signal, altering the rendering of the audio output.

17. The headset device of claim 16, wherein the headset device comprises two earbuds.

* * * * *